United States Patent
Crivellari et al.

(10) Patent No.: US 11,203,247 B2
(45) Date of Patent: Dec. 21, 2021

(54) THERMAL REGULATION SYSTEM PROVIDED WITH PELTIER CELL FOR ELECTRIC DRIVE VEHICLES

(71) Applicant: FCA Italy S.p.A., Turin (IT)

(72) Inventors: Attilio Crivellari, Turin (IT); Walter Ferraris, Orbassano (IT); Fausto Di Sciullo, Turin (IT); Federica Bettoja, Orbassano (IT); Francesco Lovuolo, Turin (IT)

(73) Assignee: FCA ITALY S.P.A., Turin (IT)

( * ) Notice: Subject to any disclaimer, the term of this patent is extended or adjusted under 35 U.S.C. 154(b) by 65 days.

(21) Appl. No.: 16/917,959

(22) Filed: Jul. 1, 2020

(65) Prior Publication Data

US 2021/0023906 A1    Jan. 28, 2021

(30) Foreign Application Priority Data

Jul. 22, 2019 (EP) .................................. 19187500

(51) Int. Cl.
| | |
|---|---|
| *B25B 21/02* | (2006.01) |
| *B60H 1/00* | (2006.01) |
| *H01M 10/625* | (2014.01) |
| *B60L 58/27* | (2019.01) |

(52) U.S. Cl.
CPC ..... *B60H 1/00278* (2013.01); *B60H 1/00385* (2013.01); *B60H 1/00478* (2013.01); *B60L 58/27* (2019.02); *H01M 10/625* (2015.04); *B60H 2001/00307* (2013.01)

(58) Field of Classification Search
CPC ............ B60H 1/00278; B60H 1/00385; B60H 1/00478; B60H 2001/00307; B60L 58/27
USPC ............................................................ 62/3.3
See application file for complete search history.

(56) References Cited

U.S. PATENT DOCUMENTS

| | | |
|---|---|---|
| 78,610,800 | 3/1905 | Force |
| 6,360,835 B1 | 3/2002 | Skala |
| 6,394,207 B1 | 5/2002 | Skala |
| 2004/0025516 A1* | 2/2004 | Van Winkle ............ F25B 21/04 |
| | | 62/3.3 |

(Continued)

FOREIGN PATENT DOCUMENTS

| | | |
|---|---|---|
| EP | 2392486 A2 | 12/2011 |
| EP | 2891569 A1 | 7/2015 |

(Continued)

OTHER PUBLICATIONS

European Search Report dated Feb. 4, 2020.

*Primary Examiner* — Davis D Hwu
(74) *Attorney, Agent, or Firm* — Heslin Rothenberg Farley & Mesiti P.C.; Victor A. Cardona, Esq.

(57) ABSTRACT

A thermal regulation system for an electric drive vehicle has two loop circuits provided with respective pumps, for circulating heat transfer fluid, and with respective heat exchangers for cooling the heat transfer fluid. A battery pack and an electric/electronic drive unit are arranged in parallel with each other in the first and second loop circuit respectively, so that they are cooled by the heat transfer fluid at flow rates which are different from each other, when the two circuits form a single cooling circuit. At least one Peltier cell is arranged along the first loop circuit to heat the heat transfer fluid circulating towards the battery pack.

15 Claims, 3 Drawing Sheets

(56) References Cited

U.S. PATENT DOCUMENTS

Figure 1:
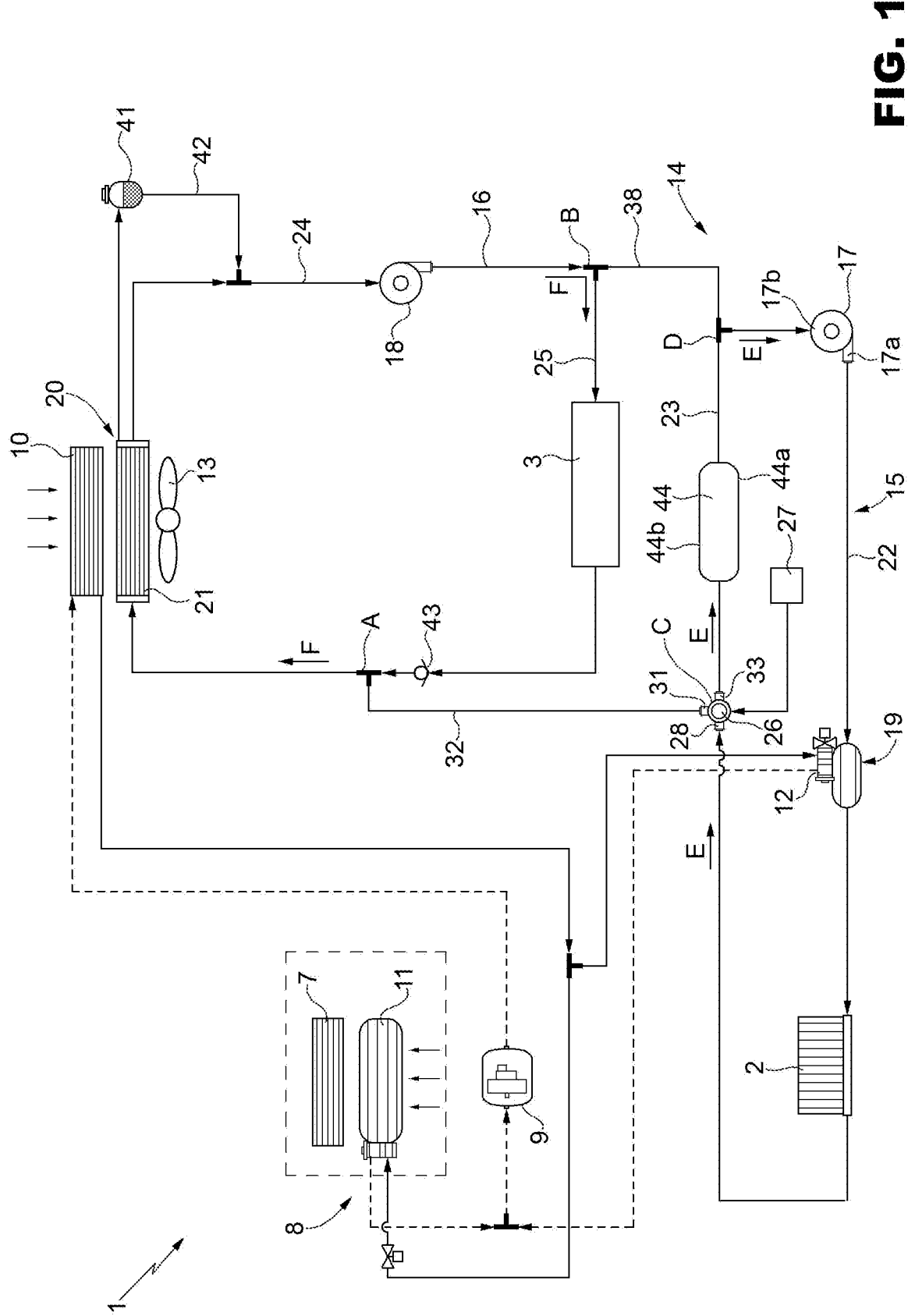

2010/0293966 A1* 11/2010 Yokomachi .............. B60H 1/02
                                                          62/3.2
2015/0101789 A1    4/2015 Enomoto et al.
2016/0153343 A1*  6/2016 Kakehashi ........... B60H 1/3228
                                                         123/41.31

FOREIGN PATENT DOCUMENTS

EP          3070772 A2    9/2016
WO       2012131256 A1   10/2012

* cited by examiner

THERMAL REGULATION SYSTEM PROVIDED WITH PELTIER CELL FOR ELECTRIC DRIVE VEHICLES

CROSS REFERENCE TO RELATED APPLICATIONS

This application claims priority from European Patent Application No. 19187500.4 filed on Jul. 22, 2019, the entire disclosure of which is incorporated herein by reference.

TECHNICAL FIELD

The present invention relates to a thermal regulation system for electric drive vehicles.

PRIOR ART

In electric vehicles propulsion systems, electronic components, for example inverters, and electric energy storage batteries work optimally if their temperature remains within a certain range of values. Particularly, it is appropriate that the temperature of the electronic components does not exceed 70° C. and that the temperature of the batteries remains within 15 and 30° C. Consequently, electric drive vehicles normally have a thermal regulation system controlled for cooling electronic components and for conditioning (i.e. cooling/heating) the high voltage battery which is installed for supplying the electric drive motor.

It is known to provide two separate cooling circuits for regulating the temperature of the electronic components and of the battery respectively.

In order to optimize the vehicle autonomy in the electric mode, it is appropriate to couple the two cooling circuits in specific temperature conditions, and to make said circuits independent in other working and/or temperature conditions.

To this end, document EP 2 392 486 describes a system that, in a first configuration, presents two distinct loop circuits, one for cooling the battery and the other for cooling the electronic components and the electric motor, whilst in a second configuration the two loop circuits are connected to each other so that they form a single cooling circuit, along which the battery and the electronic components are arranged in series. The switching between the two configurations is obtained by controlling two control valves of the three-way or four-way types.

This solution, although valid, has a drawback in the second configuration, the one with a single cooling circuit. In fact, the battery and the electronic components are crossed by the same flow rate of circulating cooling fluid, so that the mode of control of thermal regulation has poor flexibility in such second configuration.

A solution to this problem has already been proposed by the present inventors in the European patent application EP 18 205 512, still secret at the date of filing of the present application. However, said solution is still open to improvement, particularly as regards the efficiency of the battery heating system.

Further solutions are known from EP 2 891 569 A1 and EP 3 070 772 A2.

OBJECT OF THE INVENTION

The object of the present invention is to implement a thermal regulation system for electric drive vehicles, which allows to solve the drawback explained above and, more generally, to improve the management of thermal regulation in function of different working conditions that may be encountered during use.

A further object of the present invention is to implement a system of the type mentioned at the beginning of the present description which allows to increase the efficiency of the heating means used in the system, with respect to currently known solutions.

SUMMARY OF THE INVENTION

According to the present invention a thermal regulation system for electric drive vehicles, as defined in claim 1, is implemented.

The present invention further relates to an electric drive vehicle as defined in claim 15.

DETAILED DESCRIPTION OF THE INVENTION

Figure 2:
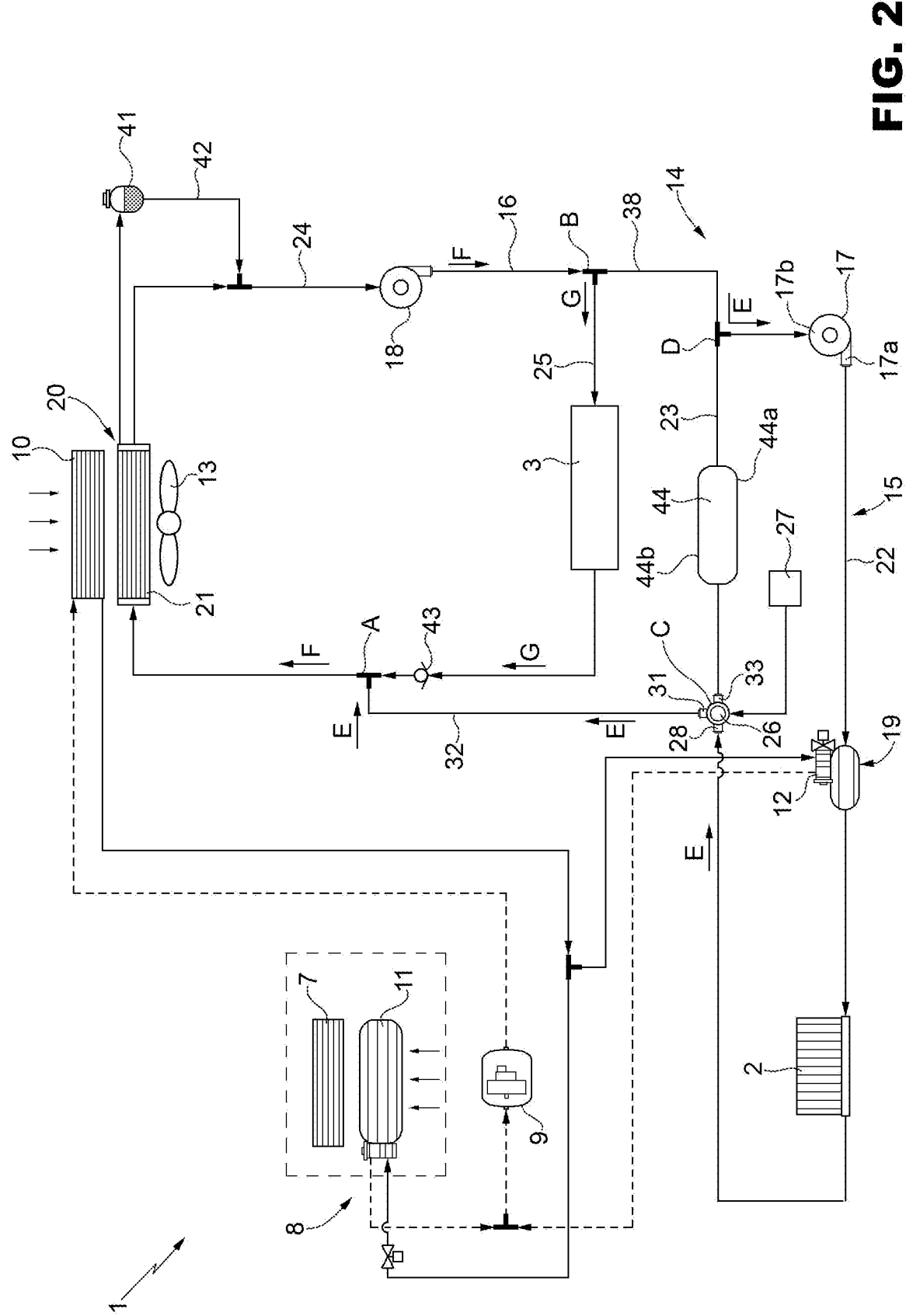
Figure 3:
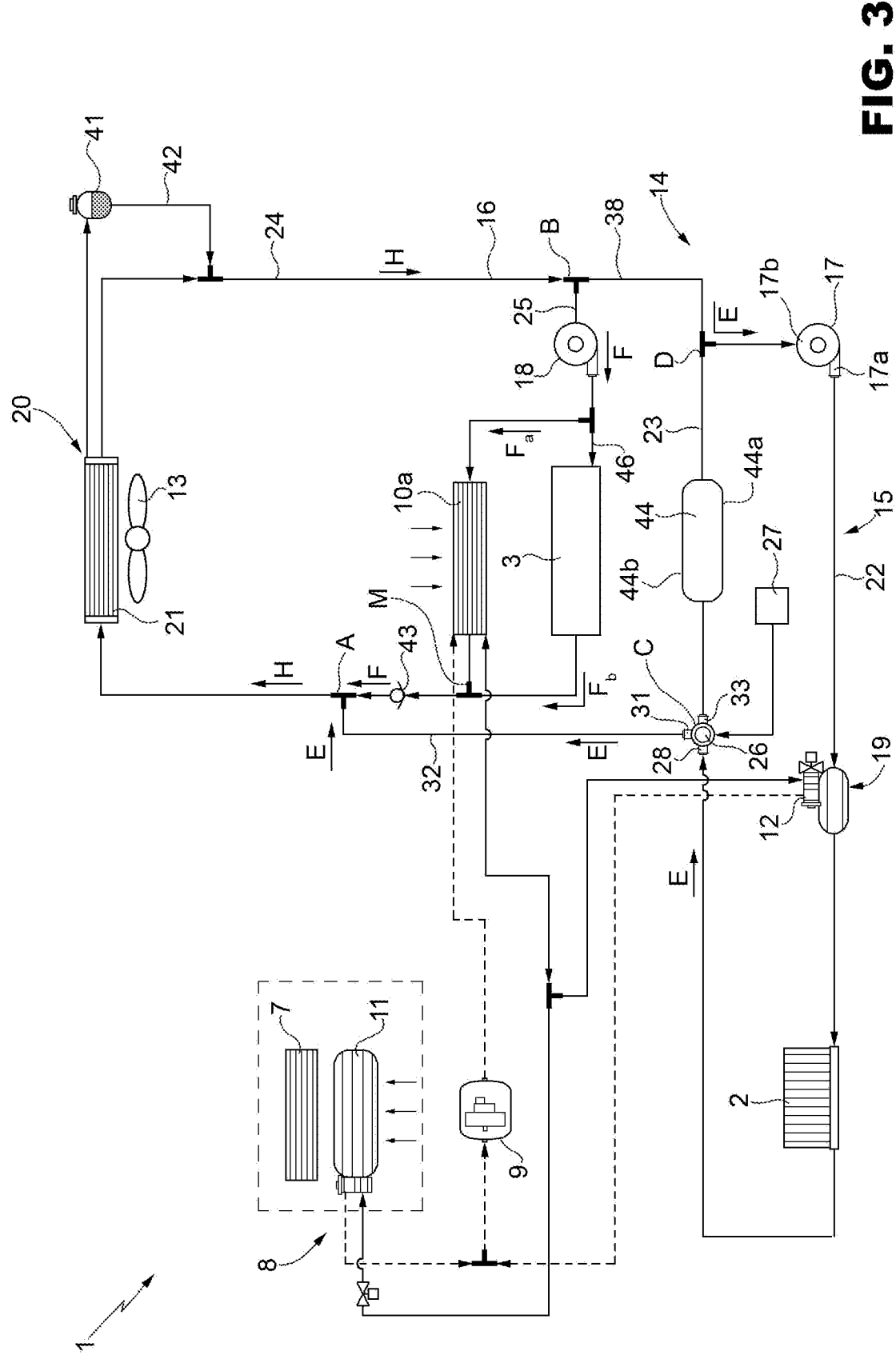

For a better understanding of the present invention a preferred embodiment is now described, purely by way of non-limiting example, with reference to the attached drawings, wherein:

FIGS. 1 and 2 show schemes with respective configurations relating to a first preferred embodiment of the thermal regulation system for electric drive vehicles according to the present invention; and FIG. 3 is analogous to FIG. 2 and shows a second preferred embodiment of the thermal regulation system according to the present invention.

In FIGS. 1 and 2, numeral reference 1 indicates, in its entirety, an electric drive vehicle (partially and schematically illustrated).

The vehicle 1 comprises a battery pack 2, particularly of the so-called "high voltage" type (for example having a 400 V voltage), which stores and provides electric energy as direct current, and an electric/electronic drive unit, which is indicated comprehensively by numeral reference 3 and particularly comprises one or more of the following components:

- at least one alternating current electric motor directly or indirectly coupled to one or more wheels of the vehicle 1 for the drive of said wheels; preferably, the electric motor is defined by a rotating electric machine which also acts as an alternator, for turning mechanical energy into electric energy during at least some of the braking operations carried out by the driver while the vehicle 1 is in motion;
- an inverter, also said PIM or "power inverter module", for turning the direct current of the battery pack 2 into alternating current for the electric motor;
- a transformer for turning high voltage electric current of the battery pack 2 into low voltage current (namely, at a voltage of 12, 24 or 48 V) and thus for supplying other utilities provided on board the vehicle 1;
- a charging device, commonly said "On Board Charging Module", for recharging the battery pack 2 during the electric braking operations of the vehicle 1.

Constructively the components of the electric drive unit 3 can be integrated with each other or arranged in separate positions, without affecting the subject of the present invention.

The vehicle 1 comprises an electric heater 7 and an air-conditioning system 8 for heating and for cooling the air in a passenger compartment (not illustrated) respectively. Particularly, the system 8 comprises a compressor 9, a condenser 10 and a main evaporator 11, used for cooling the air in the passenger compartment. According to embodiments not illustrated, for top-class vehicles and/or passenger compartments of relatively high dimensions, the system 8 can comprise an additional evaporator for a greater comfort of rear passengers.

The system 8 further comprises an exchanger named "chiller" and indicated by numeral reference 12, for thermal exchange between the coolant of the system 8 and a heat transfer fluid, for example water and glycol.

The exchanger 12 is arranged in parallel with the evaporator 11 and has a function that will be explained more in details in the following. In the embodiment illustrated in FIGS. 1 and 2, the condenser 10 is of the air-type, namely it is arranged in a frontal area of the vehicle and is cooled by a flow of environmental air, external to the vehicle 1, optionally by means of forced ventilation, namely by means of the drive of a fan 13.

The vehicle 1 comprises, then, a thermal regulation system 14 for regulating the temperature of the electric drive unit 3 and of the battery pack 2 by means of a heat transfer fluid. The system 14 comprises two loop circuits 15 and 16, and two pumps 17, 18 arranged along the loop circuits 15 and 16 respectively for circulating the heat transfer fluid. The system 14 further comprises the exchanger 12 and a heat exchanger 20. The exchangers 12 and 20 are arranged along the loop circuits 15 and 16 respectively for cooling the heat transfer fluid. Particularly, the exchanger 12 and the evaporator 11 are associated to valves equipped with locking systems or with electronic regulating systems to control the flow of refrigerant in the two different branches of the system 8 which are dedicated to the air conditioning of the passenger compartment and to the cooling of the loop circuit 15.

The heat exchanger 20 comprises a radiator 21 arranged preferably in the frontal area of the vehicle 1 and cooled by means of a flow of environmental air, external to the vehicle 1, also by means of forced ventilation. For example, the radiator 21 is aligned with the condenser 10 for being crossed as well by the air flow of the fan 13.

The loop circuit 16 has two connection or branch points, indicated respectively by A and B, which are connected to respective connection or branch points C and D of the loop circuit 15.

The connection points C and D divide the loop circuit 15 into two consecutive branches 22 and 23: the pump 17, the exchanger 12 and the battery pack 2 are arranged along the branch 22. The pump 17 is arranged so that it allows the heat transfer fluid to flow in the branch 22 from the connection point D to the connection point C. Preferably, the exchanger 12 and the battery pack 2 are arranged between a delivery port 17a of the pump 17 and the connection point C.

Similarly, the connection points A and B divide the loop circuit 16 into two consecutive branches 24 and 25: the heat exchanger 20 is arranged along the branch 24, while the electric drive unit 3 is arranged along the branch 25. The pump 18 can be arranged along the branch 24 as in the embodiment of FIGS. 1 and 2, or can be arranged along the branch 25, as in the embodiment of FIG. 3. Particularly, the pump 18 is arranged so that it allows the heat transfer fluid to flow in the branch 24 from the connection point A to the connection point B, and in the branch 25 from the connection point B to the connection point A.

The connection point A is defined by a T-shaped connection member, while the connection point C is defined by a three-way, two-position valve 26 switchable by an electronic command and control unit 27 of the vehicle 1. In the preferred embodiment, the connection point C is connected to the connection point A solely by means of a duct 32 and by means of the valve 26, arranged in correspondence of the connection point C. More in details, the valve 26 has:

an inlet 28 connected to the branch 22 for receiving a flow rate E of heat transfer fluid delivered by the delivery port 17a of the pump 17;

an outlet 31 which communicates with the connection point A by means of a duct 32; and an outlet 33 which is connected to the branch 23 and communicates with a suction port 17b of the pump 17 by means of the connection point D.

According to a preferred embodiment of the present invention, the connection point D communicates with the connection point B permanently, namely under any operative configuration or condition. Particularly, the connection points B and D are defined by respective T-shaped connection members connected to each other solely and directly by means of a duct 38.

The branch 24 is connected to an expansion or compensation tank 41 by means of a duct 42. The tank 41 is arranged, preferably, between the heat exchanger 20 and the connection point B. Since points B and D communicates permanently with each other, the only tank 41 carries out its compensation function not only for the loop circuit 16, but also for the loop circuit 15, without necessity of a further dedicated tank.

Preferably, a unidirectional valve 43 is provided along the branch 25, for preventing fluid fluxes from the connection point A towards the connection point B (namely to prevent a counterflow or "reverse flow" condition). As will be explained also in the following, the valve is not strictly necessary. In the embodiment of FIG. 3, the valve 43 is arranged between the connection point A and the delivery port of the pump 18.

According to a preferred embodiment of the present invention, the electric drive unit 3 is arranged along the branch 25 of the loop circuit 16 and, under normal operative conditions, is cooled by at least a part of the heat transfer fluid sent under pressure by the pump 18.

The system 14 can work in two different configurations in response to the switching of the valve 26. In a first configuration (FIG. 1), the inlet 28 is in communication with the outlet 33, so that the flow rate E of the heat transfer fluid pumped by the pump 17 circulates towards the suction port 17b. Meantime, the pump 18 delivers a flow rate F of the heat transfer fluid which flows from the connection point B into the branch 25, without entering the loop circuit 15 because of the theory of preservation of the flow rate, so that there is no fluid mixing between the two loop circuits 15 and 16. In other words, the two loop circuits 15 and 16 work independently of each other, with respective flow rates E and F imposed by the respective pumps 17 and 18. The pump 17 and the exchanger 12 are activated/used when the battery pack 2 has a temperature higher than a first preset threshold (for example 30° C.), so that the flow rate E of the heat transfer fluid is cooled by the exchanger 12 and removes heat from the battery pack 2. Meantime, the pump 18 and the heat exchanger 20 are activated when the electric drive unit 3 has a temperature higher than a second preset threshold (for example 70° C.), so that the flow rate F of the heat transfer fluid is cooled by the heat exchanger 20 and removes heat from the electric drive unit 3. Meantime, in the ducts 32 and 38 there is substantially no fluid motion, so that there is substantially no heat transfer between fluxes circulating in the loop circuits 15 and 16 respectively.

If the temperature of the electric drive unit 3 is below a further preset threshold (optionally equal to the second threshold above mentioned), the loop circuit 16 can be deactivated, for example by stopping the pump 18, for avoiding waste of energy, while the loop circuit 15 remains active.

Advantageously, the system 14 further comprises a Peltier cell 44, having a hot side 44a and a cold side 44b. In the preferred embodiment, the Peltier cell is arranged along the loop circuit 15 and is commanded by the electronic unit 27 so that it heats, by means of the hot side 44a, the flow rate E of the heat transfer fluid when the temperature of the battery pack 2 is below a third preset threshold (for example 0° C.). When the heat transfer fluid heated in this way by the hot side 44a of the Peltier cell 44 passes through the battery pack 2, it heats it, bringing the temperature back to an acceptable value.

Preferably, the Peltier cell 44 is arranged along the branch 23 for heating the battery pack 2 only when the system 14 works in the first configuration just described. Nevertheless, also embodiments wherein the Peltier cell is arranged along the branch 22 fall under the protection scope of the present invention.

In the preferred embodiment, the cold side 44b of the Peltier cell 44 is used for cooling the electric/electronic unit for the electric drive 3 when it has a temperature higher than the second preset threshold previously mentioned.

Construction details of the Peltier cell 44 has not been represented in FIGS. 1-3, since they are not relevant for the objects of the present discussion. It is to be intended that the Peltier cell 44 can show the construction details of any type of Peltier cell known. Obviously, it is also possible to have more Peltier cells in series.

In the second configuration (FIG. 2), the inlet 28 communicates with the outlet 31, so that the flow rate E of the heat transfer fluid pumped by the pump 17 flows in the duct 32 towards the connection point A and comes back to the suction port 17b of the pump 17 through the duct 38, so that the two loop circuits 15 and 16 are not independent anymore, but are integrated to form a sole cooling circuit. Particularly, the heat transfer fluid sucked by the pump 17 does not flow into the branch 23, so that the Peltier cell 44 does not cause any pressure drop in this second configuration.

In the embodiment of FIG. 2, in correspondence of the connection point A, the flow rate E delivered by the pump 17 flows into the branch 24 together with a flow rate G of the heat transfer fluid which comes from the branch 25 of the loop circuit 16.

It is thus clear that in the system 14 the electric drive unit 3 is arranged in parallel with the battery pack 2 and is cooled by a flow rate which has a value (G) different from the one which cools the battery pack 2 and which can be regulated by varying the flow rates E and F by acting on the rotation speeds of the pumps 17 and 18, for example by means of commands based on control logics implemented in the electronic unit 27.

In the embodiment represented in FIG. 3, as above mentioned, the pump 18 is arranged along the branch 25, preferably between the electric drive unit 3 and the connection point B. In this case, in the second configuration in correspondence of the connection point A the flow rates E and F of heat transfer fluid delivered by the pumps 17 and 18 flow together into the branch 24, to form a total flow rate H, which goes through the heat exchanger 20 and then divides again into the flow rates E and F in correspondence of the connection point B. Also in this case, the electric drive unit 3 is cooled by a flow rate which has a value (F) different from the one which cools the battery pack 2 and which can be regulated by varying the rotation speed of the pump 18.

Again considering the preferred embodiment of FIG. 3, in correspondence of a point L downstream of the delivery port of the pump 18, the branch 25 divides or branches into two portions 45 and 46 which are arranged in parallel with each other and reunite at a point M which is upstream of the valve 43 and of the connection point A (considering the direction of the flux from B towards A). Meantime, the condenser 10 is substituted by a so-called water cooled condenser 10a which is arranged along the portion 45 for being cooled by a part Fa of the flow rate F of the heat transfer fluid circulating in the branch 25, while the electric drive unit 3 is arranged along the portion 46 for being cooled by a remaining part Fb of the flow rate F. Particularly, the flow rate F pumped by the pump 18 divides into the parts Fa and Fb as a function of the pressure drops present in the two portions 45 and 46.

According to an embodiment not illustrated, a regulation valve is provided in correspondence of the point L for obtaining appropriate desired values of the flow rates Fa and Fb.

According to a further embodiment not illustrated (applicable both to FIG. 2 and to FIG. 3), the valve 43 is absent. In this case, if the pump 18 is deactivated or does not work because of a malfunction, in correspondence of the connection point A the flow rate E pumped by the pump 17 divides into two parts, one of which enters the branch 25 (in counter-flow with respect to the normal operative conditions) and cools the electric drive unit 3. This operative mode allows, on one side, the cooling of the electric drive unit 3 during the battery charging step without requiring the switching on of the pump 18 (for making the heat transfer fluid recirculate towards the connection point D), and on the other side it increases the level of redundancy by providing a safety function in the event of a malfunction or interruption of operation of the pump 18.

It is clear from the above that, when the valve 26 connects the points A and B to form a single cooling circuit, the system 14 has an extremely flexible operation, since it is possible to vary the cooling flow rate of the electric drive unit 3 with respect to the flow rate E that cools the battery pack 2. Particularly, the battery pack 2 and the electric drive unit 3, being arranged in parallel, and not in series, can be crossed by different flow rates of fluid also in this second configuration, adjustable by acting on the rotation speeds of the pumps 17, 18.

Moreover, as above described, in this configuration with a single cooling circuit it is possible to operate according to different modes, for example depending on external environmental conditions and/or with a view to optimize energy consumption.

Generally, in the second configuration, with the two circuits 15, 16 coupled to each other to form a single cooling circuit, with the same number of components, the flow rate of the heat transfer fluid to the exchanger 21 (radiator) is higher.

Moreover, studies and tests carried out by the Applicant have shown that the use of the Peltier cell 44 for heating the battery pack 2 and, optionally, for cooling the electric/electronic drive unit 3 allows to work with a very high efficiency, thus achieving significantly better performances than that provided by traditional heaters with high voltage electrical resistance.

Lastly, it is clear that modifications and variants can be made to the system 14 and to the vehicle 1 here described with reference to the attached figures without departing from the scope of the present invention, as defined by the attached claims.

Generally, for switching the system 14 between the first and the second configuration and/or for controlling the operation in the second configuration, the number and/or position and/or type of valves used could be different from the preferred embodiments above described. With appropriate measures, the direction of the flux imposed by the pump 18 could be optionally as opposed to the one shown.

Moreover, the system 14 could have one or more auxiliary branches, connected to the loop circuit 15 or 16, for extracting heat transfer fluid and for cooling other components of the vehicle 1 (besides the battery pack 2, the electric drive unit 3 and the optional condenser 10a), moreover, instead of the condenser 10a in FIG. 3, a different component to be cooled could be provided.

What is claimed is:

1. A thermal regulation system for an electric drive vehicle; the system comprising:
    a first and a second loop circuit, for circulating a heat transfer fluid; said first loop circuit having a first connection point and a second connection point that divide the first loop circuit into a first branch and a second branch; said second loop circuit having a third connection point and a fourth connection point that divide the second loop circuit into a third branch and a fourth branch; said first connection point and said second connection point being able to be connected to said third connection point and said fourth connection point respectively;
    a first pump arranged along said first branch so that the heat transfer fluid flows from the second connection point to the first connection point;
    a second pump arranged along said second loop circuit;
    a first heat exchanger and a second heat exchanger able to cool the heat transfer fluid and arranged respectively along said first loop circuit and said second loop circuit;
    a battery pack and an electric/electronic drive unit arranged respectively along said first loop circuit and said second loop circuit for being cooled by the heat transfer fluid;
    a control valve switchable between a first configuration, wherein said first circuit and said second loop circuit convey respective fluid fluxes independent to each other, and a second configuration, wherein the first connection point communicates with the third connection point and the second connection point communicates with the fourth connection point to form a single cooling circuit;
    the electric/electronic drive unit and the battery pack being arranged in parallel with each other in said single cooling circuit of the second configuration, to allow the drive unit and the battery pack to be cooled by the heat transfer fluid at flow rates which are different from each other, and
    at least one Peltier cell having a hot side and a cold side arranged along said first loop circuit, so that the at least one cell heats the heat transfer fluid crossing said first loop circuit by said hot side.

2. The system according to claim 1, wherein:
    said first connection point is connected to said third connection point solely by a first duct and by said control valve, said control valve being arranged in correspondence of said first connection point, and
    said second connection point is connected to said fourth connection point solely and directly by means of a second duct.

3. The system according to claim 1, wherein said battery pack and said electric/electronic drive unit are arranged along said first branch and along said fourth branch respectively.

4. The system according to claim 3, wherein said first heat exchanger and said second heat exchanger are arranged along said first branch and along said third branch respectively.

5. The system according to claim 1, wherein said Peltier cell is arranged along said second branch of said first loop circuit.

6. The system according to claim 5, wherein the cold side of said Peltier cell is designed for cooling said electric/electronic drive unit arranged along said fourth branch.

7. The system according to claim 1, further comprising a tank connected to said third branch.

8. The system according to claim 1, wherein said second pump is arranged such that the heat transfer fluid flows from the third connection point towards the fourth connection point in the third branch, and from the fourth connection point towards the third connection point in the fourth branch.

9. The system according to claim 8, further comprising a nonreturn valve arranged along said fourth branch to prevent fluxes from said third connection point towards said fourth connection point.

10. The system according to claim 8, wherein said second pump is arranged along said third branch.

11. The system according to claim 8, wherein said second pump is arranged along said fourth branch.

12. The system according to claim 11, wherein said second pump is arranged between said electric/electronic drive unit and said fourth connection point.

13. The system according to claim 1, wherein said fourth branch comprises a first duct portion and a second duct portion arranged in parallel with each other; said electric/electronic drive unit being arranged along said first duct portion or said second duct portion; an additional component to be cooled being arranged along the other of said first portion and said second portion.

14. The system according to claim 13, wherein said additional component to be cooled is defined by a water-cooled condenser, being part of an air-conditioning system in a passenger compartment.

15. An electric drive vehicle comprising a thermal regulation system according to claim 1.

* * * * *